United States Patent
Lang et al.

(10) Patent No.: US 9,563,462 B2
(45) Date of Patent: *Feb. 7, 2017

(54) SUSPENDING AND RESUMING VIRTUAL MACHINES

(71) Applicant: International Business Machines Corporation, Armonk, NY (US)

(72) Inventors: Jakob C. Lang, Altdorf (DE); Angel Nunez Mencias, Stuttgart (DE); Thomas Pohl, Bempflingen (DE); Martin Troester, Rennngen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/742,313

(22) Filed: Jun. 17, 2015

(65) Prior Publication Data

US 2016/0048405 A1 Feb. 18, 2016

Related U.S. Application Data

(63) Continuation of application No. 14/736,617, filed on Jun. 11, 2015.

(30) Foreign Application Priority Data

Aug. 13, 2014 (GB) .................................. 1414347.3

(51) Int. Cl.
G06F 9/455 (2006.01)

(52) U.S. Cl.
CPC . G06F 9/45558 (2013.01); *G06F 2009/45575* (2013.01)

(58) Field of Classification Search
None
See application file for complete search history.

(56) References Cited

U.S. PATENT DOCUMENTS

| | | | | |
|---|---|---|---|---|
| 5,371,857 A | * | 12/1994 | Takagi | .................... G06F 13/24 710/260 |
| 7,529,897 B1 | * | 5/2009 | Waldspurger | ....... G06F 11/1438 711/161 |

(Continued)

OTHER PUBLICATIONS

Hidayat, A., "Real-Time Clock with MC146818," ofilabs.com, Aug. 31, 2012, pp. 1-3. http://ariya.ofilabs.com/2012/08/real-time-clock.html.

(Continued)

*Primary Examiner* — Emerson Puente
*Assistant Examiner* — Zhi Chen
(74) *Attorney, Agent, or Firm* — Mark G. Edwards

(57) ABSTRACT

Suspending multiple virtual machines executed simultaneously a hypervisor a data processing system, including: sending, by a control instance, a request to the hypervisor to suspend virtual machines at a given future first point in time; the hypervisor determining if its virtual machines can be suspended at the first point in time, and, if the suspending is possible, returning a suspend handle to the control instance and storing the suspend handle, otherwise returning an invalid handle; when receiving a suspend handle from the hypervisor in return to the request to suspend virtual machines, the control instance sending a suspend command to the hypervisor, wherein the respective suspend handle is provided to the corresponding hypervisor; the hypervisor determining if the received suspend handle is equal to its stored handle and, if yes, suspending its virtual machines at the first point in time.

14 Claims, 9 Drawing Sheets

(56) References Cited

U.S. PATENT DOCUMENTS

| | | | |
|---|---|---|---|
| 7,788,664 B1 | 8/2010 | Janakiraman et al. | |
| 8,230,203 B2* | 7/2012 | Neiger | G06F 9/45533 |
| | | | 712/244 |
| 8,635,395 B2 | 1/2014 | Colbert | |
| 2010/0235557 A1 | 9/2010 | Guo et al. | |
| 2010/0235835 A1 | 9/2010 | Nishiguchi et al. | |
| 2010/0332643 A1 | 12/2010 | Benari | |
| 2012/0096458 A1* | 4/2012 | Huang | G06F 9/45533 |
| | | | 718/1 |
| 2012/0131574 A1* | 5/2012 | Day, II | G06F 9/45558 |
| | | | 718/1 |
| 2014/0089920 A1* | 3/2014 | Yamamoto | G06F 1/3287 |
| | | | 718/1 |
| 2015/0127833 A1* | 5/2015 | Hegdal | G06F 9/5016 |
| | | | 709/226 |

OTHER PUBLICATIONS

Mell et al., "The NIST Definition of Cloud Computing, Recommendations of the National Institute of Standards and Technology," Special Publication 800-145, National Institute of Standards and Technology, U.S. Department of Commerce, Sep. 2011, pp. 1-7.
GB Application 1414347.3, entitled "Suspending and Resuming Virtual Machines," filed Aug. 13, 2014.
U.S. Appl. No. 14/736,617, entitled "Suspending and Resuming Virtual Machines," filed Jun. 11, 2015.
List of IBM Patents or Patent Applications Treated as Related.

* cited by examiner

SUSPENDING AND RESUMING VIRTUAL MACHINES

BACKGROUND

The present disclosure relates in general to data processing systems, and in particular, to a method and a system for suspending and resuming multiple virtual machines executed simultaneously by hypervisors on data processing systems.

In virtualized computer systems it may be desirable in certain circumstances to suspend a virtual machine (VM) and resume it at a later time. In order to save resources concerning e.g. computing power, energy or memory it may also be worthwhile to suspend a virtual machine and resume it at a later time. Also, for example, changes to the VM's configuration file cannot be made while the VM is executing. In order to make such changes, the VM is first suspended. This causes the VM execution to halt and the VM's state to be serialized and written to a file, commonly known as a checkpoint file or a suspend file. After the VM is suspended, the desired change can be made to the VM's configuration file. The VM having the changed configuration can then be resumed from the saved state.

SUMMARY

As described herein, it is an objective to provide a method for suspending multiple virtual machines executed simultaneously by hypervisors with increased reliability and availability of network resources.

Another objective is to provide a data processing system for executing the method for suspending multiple virtual machines executed simultaneously by hypervisors with increased reliability and availability of network resources.

These objectives are achieved by the features of the independent claims. The other claims, the drawings and the specification disclose advantageous embodiments.

According to a first aspect, as described herein, a method is proposed for suspending multiple virtual machines executed simultaneously by at least one hypervisor in at least one data processing system, comprising (i) sending, by a control instance, a request to the at least one hypervisor to suspend virtual machines at a given future first point in time; (ii) in response to receiving a request to suspend virtual machines from the control instance, the hypervisor determining if its virtual machines can be suspended at the first point in time, and, if the suspending is possible, returning a suspend handle to the control instance and storing the suspend handle, otherwise returning an invalid handle; (iii) when receiving a suspend handle from the hypervisor in return to the request to suspend virtual machines, the control instance sending a suspend command to the hypervisor, wherein the respective suspend handle is provided to the corresponding hypervisor; (iv) in response to receiving a suspend command with a suspend handle from the control instance, the hypervisor determining if the received suspend handle is equal to its stored handle and, if that is the case, suspending its virtual machines at the first point in time.

Firmware simulation allows to couple multiple system environments utilizing virtual machines for interface verification and test. These firmware components maintain open network connections between each other.

The protocols expect continuously running timers without longer gaps or delays. This inhibits suspending/resuming these environments without restarting the simulation.

In the state of the art coupled virtual machines cannot be suspended/resumed to preserve resources like network resources. Instead, either the resources are left running unused, with the disadvantage of wasting resources, e.g. computing power, energy or memory, or the resources have to be stopped and restarted, causing significant overhead on the user side. Stopping and restarting also implies reproducing the previous state of the virtual machines. Suspending allows to bring development test setup to a certain stage and preserve for later use.

A precondition for an embodiment of a method is that all host operating system timers are synchronized via a standard system timer protocol, which is normally state of the art. According to the proposed method a two step clock-preserving suspend command for virtual machines is proposed, which comprises at least a prepare and an execute process step. An application programming interface (API) on hypervisor level may for this purpose be implemented in order to dump/set virtual real time clock parameters for each connected virtual machine. So, the intention of the proposed method is not to be cycle time accurate between hypervisors. The virtual real time clocks of the multiple virtual machines do not have to be synchronized. But the virtual real time clocks are simply saved and restored at a given point in time.

Thus, due to an embodiment of a described method, if a user decides to suspend virtual machines via a control instance, the control instance will first call a hypervisor API for each involved hypervisor. Commands for preparing the suspending process, suspending the virtual machines in case all involved hypervisors are ready, or canceling the suspending process if not all involved hypervisors are ready, are executed on the data processing system.

Favorably the an embodiment of a described method may further comprise (i) sending, by the control instance, a request to the at least one hypervisor to resume virtual machines at a given future second point in time; (ii) in response to receiving a request to resume virtual machines from the control instance, the hypervisor determining if its suspended virtual machines can be resumed at the second point in time, and, if the resuming is possible, returning a resume handle to the control instance, otherwise returning an invalid handle; (iii) when receiving a resume handle from the hypervisor in return to the request to resume virtual machines, the control instance sending a resume command to the hypervisor, wherein the respective resume handle is provided to the corresponding hypervisor; (iv) in response to receiving a resume command with a resume handle from the control instance, the hypervisor determining if the received resume handle is equal to its stored handle and, if that is the case, resuming its suspended virtual machines at the second point in time.

Thus, due to an embodiment of a described method, if a user decides to resume simulation environment utilizing virtual machines via a control instance, the control instance manager first retrieves a timer state from a state database. The control instance then picks the involved hypervisors. The control instance will then call a hypervisor API for each involved hypervisor. Commands for preparing the resuming process, resuming the virtual machines in case all involved hypervisors are ready, or canceling the resuming process if not all involved hypervisors are ready, are executed on the data processing system. The result will be that all related virtual machines are started at the same time, using the previous time of the virtual machines.

In a favorable embodiment the method may further comprise, for suspending multiple virtual machines, (i) the hypervisor returning a clock state of the virtual machine requested for suspending to the control instance; (ii) the control instance storing the clock state of the virtual machine. By this way it is possible to save the actual clock state of the virtual machine at the point in time when the virtual machine is suspended for future use when resuming the virtual machine after retrieving the stored previous clock state of the virtual machine.

In another favorable embodiment the method may further comprise, for resuming multiple virtual machines, (i) the control instance retrieving a stored clock state of the virtual machine requested for resuming and returning the clock state to the corresponding hypervisor; (ii) the hypervisor setting a clock state of the virtual machine to the retrieved clock state. Thus it is possible to retrieve the previous clock state and pass it to the involved hypervisor for setting the previous clock state of the virtual machine during the resume process and starting the virtual machine again at the exact clock state when it was suspended.

Favorably the virtual machines may be connected via a network. For executing firmware simulation it may be necessary to couple various system environments for interface testing. So the firmware components maintain open network connections between each other. Therefore coupling of the multiple virtual machines might be a common state during the simulation process.

Advantageously at least two hypervisors may be implemented on different data processing systems, represented on different hardware architectures. This may be favorably the case, if an application programming interface (API) may for this purpose be implemented on hypervisor level as well as a virtual real time clock may be emulated in a virtual hardware, in order to dump/set virtual real time clock parameters for each connected virtual machine.

In a favorable embodiment, a method further comprises, for multiplying virtual machines (i) suspending the virtual machines (10, 14); (ii) copying the suspended virtual machines; (iii) retrieving the clock states of the suspended virtual machines; (iv) resuming the copied virtual machines with the retrieved clock states. Thus connected virtual machines may be cloned. The copied virtual machines are able to be resumed and be running in their connected virtual time.

Due to an advantageous embodiment, the method upon triggering for suspending by the control instance may comprise, (i) the control instance calling for suspending the virtual machines; (ii) the corresponding hypervisor suspending the virtual machine; (iii) the hypervisor storing the states of the virtual machine; (iv) the hypervisor returning a clock state of the virtual machine to the control instance; (v) the control instance storing the states and the clock state of the virtual machines. Thus a described method is based on storing the states of the virtual machines to be suspended and especially storing the clock states of the virtual machines. The information concerning the states and the clock states are gathered by the hypervisor from the virtual machines and then passed to the control instance where a control instance manager will store the information, e.g. in a database of the control instance.

Due to an advantageous embodiment, the method upon triggering for resuming by the control instance may further comprise, (i) the control instance calling for resuming the virtual machines and retrieving the clock states of the virtual machines; (ii) the corresponding hypervisor setting the clock state of the virtual machine to the retrieved clock state; (iii) the hypervisor restoring the states of the virtual machine; (iv) the hypervisor starting the virtual machine; (v) the control instance updating the states of the virtual machines in the database. As a described method is based on storing the states of the virtual machines to be suspended and especially storing the clock states of the virtual machines the control instance upon calling for resuming the virtual machines will first retrieve the clock states of the virtual machines to be resumed from the database. The information concerning the states and the clock states are passed to the hypervisor by the control instance and then used to set the clock states of the virtual machines to the retrieved clock states and then restore the states of the virtual machines in order to start them at the previous clock state. The actual states of the virtual machines, i.e. the running state after a successful resume or a suspended state after a successful suspend of a virtual machine, respectively, are then passed to the control instance where a control instance manager will update the information on the data base of the control instance.

Advantageously the multiple virtual machines may be resumed at the clock state where the virtual machines were suspended. This may favorably be performed by retrieving the stored clock states of the virtual machines and then setting the clock states of the virtual machines to the retrieved clock states by the respective hypervisors.

Favorably, upon resuming the multiple virtual machines, an offset between system clocks of the multiple virtual machines may be determined. This may allow to determine the time interval the virtual machines were suspended. As the intention of the proposed method is not to be cycle time accurate between hypervisors, the virtual real time clocks of the multiple virtual machines are never synchronized. So a method is working not with absolute time stamps but with relative time stamps. Therefore offsets of system clocks and/or virtual real time clocks may be working as well.

So, advantageously the virtual machine may be resumed at a clock state updated with the offset between system clocks of the multiple virtual machines when being suspended. Thus the relative time stamp for further processing in a simulation environment may be sufficient in order to resume testing without delay and interruption of a network connection.

In an advantageous embodiment the virtual real time clock may be adapted to the retrieved clock state of the virtual machine resumed. Thus the system clock of the virtual machine does not need to be changed after resuming the virtual machine. So the virtual machine may execute simulation tasks on a time scale which is running continuously. This may be favorable for recording testing processes and further analyzing the data on a continuous level.

Favorably the first point in time to suspend the virtual machines and/or the second point in time to resume the virtual machines may be synchronized by the control instance for the at least two hypervisors. It is a major advantage of a method that the virtual machines are suspended at the same point in time and/or that the virtual machines are also resumed at the same point in time. This can be achieved by calling the corresponding hypervisors in order to synchronize the first and the second point in time. So the suspending process and/or the resuming process may be executed at the same point in time. Therefore the hypervisors in use may have synchronized their internal timers, e.g. by an external time server like a network time protocol (NTP).

According to a further advantageous aspect of a data processing program for execution in a data processing system is proposed comprising an implementation of an instruction set for performing a method as described above when the data processing program is run on a computer.

Further a favorable computer program product is proposed comprising a computer usable medium including a computer readable program, wherein the computer readable program when executed on a computer causes the computer to perform a method for suspending multiple virtual machines executed simultaneously by at least one hypervisor in at least one data processing system, comprising (i) sending, by a control instance, a request to the at least one hypervisor to suspend virtual machines at a given future first point in time; (ii) in response to receiving a request to suspend virtual machines from the control instance, the hypervisor determining if its virtual machines can be suspended at the first point in time, and, if the suspending is possible, returning a suspend handle to the control instance and storing the suspend handle, otherwise returning an invalid handle; (iii) when receiving a suspend handle from the hypervisor in return to the request to suspend virtual machines, the control instance sending a suspend command to the hypervisor, wherein the respective suspend handle is provided to the corresponding hypervisor; (iv) in response to receiving a suspend command with a suspend handle from the control instance, the hypervisor determining if the received suspend handle is equal to its stored handle and, if that is the case, suspending its virtual machines at the first point in time.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire connection, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to block diagrams of methods, apparatus (systems) and computer program products according to embodiments of the disclosure. It will be understood that each block of the flowchart illustrations and/or block diagrams, and combinations of blocks in the block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the block diagram block or blocks.

Due to a further aspect of the disclosure, a data processing system for execution of a data processing program is proposed, comprising software code portions for performing a method described above.

BRIEF DESCRIPTION OF THE SEVERAL VIEWS OF THE DRAWINGS

Embodiments of the present disclosure together with the above-mentioned and other objects and advantages may best be understood from the following detailed description of the embodiments, but not restricted to the embodiments, wherein.

DETAILED DESCRIPTION

Figure 1:
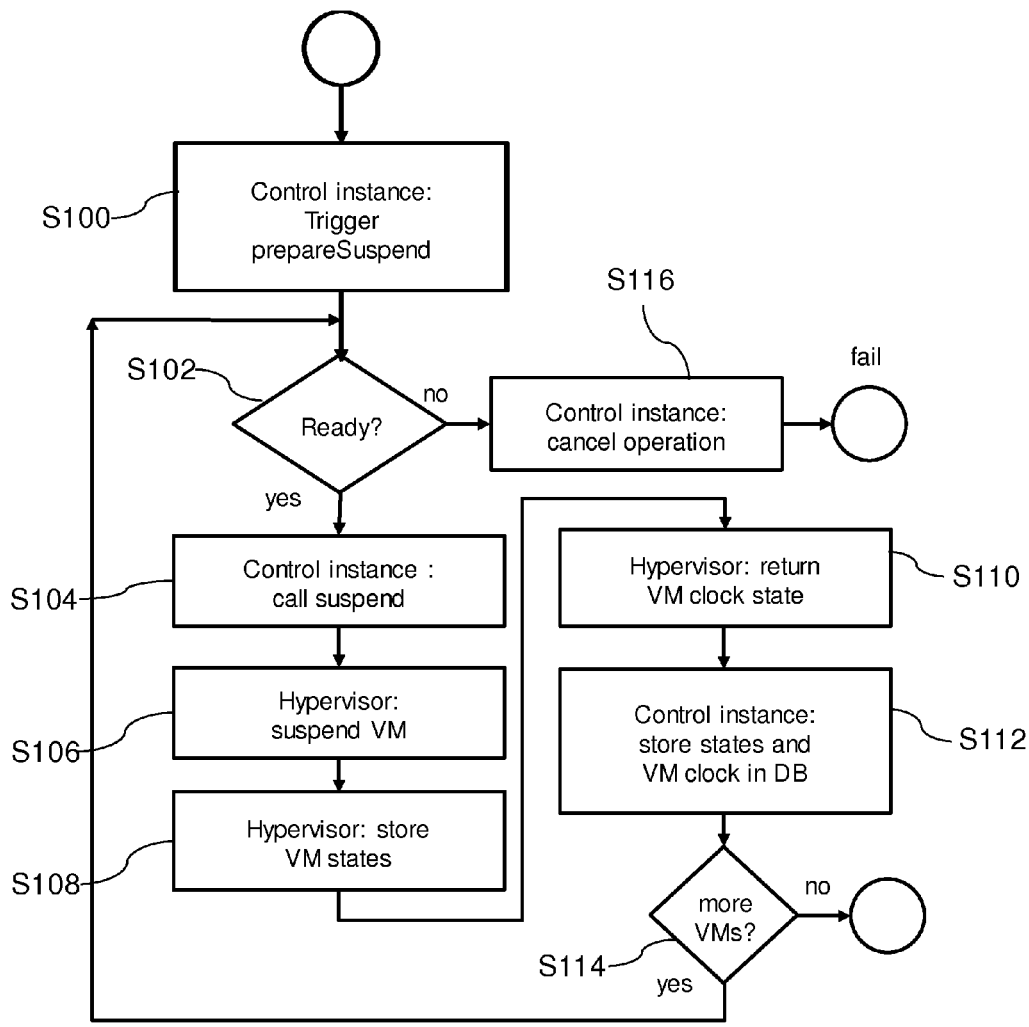
FIG. 1 depicts a flowchart for explanation of the method for suspending multiple virtual machines according to an embodiment, for the case of suspending virtual machines.

A problem with various existing approaches is that it may take a certain amount of time to write out the VM's state to a file and then read it back again. For a VM with a memory size of many gigabytes, this can take tens of seconds to potentially minutes. Because of this prolonged read and write cycle, the VM would incur downtime that can cause the VM's network connection to expire and close. Even more important is the fact that the clock of the VM is usually synchronized with the hypervisor during startup. The gap between the synchronized VM time and the VM time during the suspension may cause a timeout. This can be mitigated by e.g. the commercial product VMware that restores the previous point in time (storing the virtual real time clock in the image). However, even in this case the time difference that occurs when suspending more VMs one after the other can cause timeouts. In addition, users and clients of the VM would not be able to access or interact with the VM during this downtime and as long as the VM is suspended. This would be viewed as an outage period for the VM.

Due to an alternative approach, a new copy of the VM is started on the same host as the old VM while the old VM is still running. It then "pre-copies" the VM's memory from the old VM to the new VM. This is followed by the steps of suspending the old VM, making any desired changes to the VM's configuration file, and resuming from the new VM. Because of the "pre-copying" step, the amount of downtime the VM encounters can be reduced quite a bit. The downside of this approach is the doubling of the VM's memory usage and CPU costs associated with the "pre-copying" step.

U.S. Pat. No. 8,635,395 B2 describes a method of suspending and resuming being carried out in a host computer having a first instance of a virtual machine running therein. The method includes the steps of instantiating a second instance of the virtual machine while guest instructions are being executed in the first instance of the virtual machine, suspending the execution of the guest instructions in the first instance of the virtual machine and storing a state of the first instance of the virtual machine. Further the method includes copying metadata maintained for pages of virtual memory space allocated for the first instance of the virtual machine and using the copied metadata as metadata for pages of virtual memory space allocated for the second instance of the virtual machine, loading the stored state into the second instance of the virtual machine, and resuming the execution of the guest instructions in the second instance of the virtual machine. In this method, the stored state does not include the virtual machine's memory. Instead of storing the virtual machine's memory and then restoring it, metadata maintained for pages of virtual memory space allocated for the first instance of the virtual machine, which include pointers to the virtual machine's memory, are copied and used as metadata for pages of virtual memory space allocated for the second instance of the virtual machine.

In the drawings, like elements are referred to with equal reference numerals. The drawings are merely schematic representations, not intended to portray specific parameters of the disclosure. Moreover, the drawings are intended to depict only typical embodiments of the disclosure and therefore should not be considered as limiting the scope of the disclosure.

FIG. 1 shows a flowchart for explanation of the method for suspending multiple virtual machines 10, 14 according to an embodiment, for the case of suspending virtual machines 10, 14. Reference numerals used for explanation are referring to elements shown in FIGS. 3 and 4.

The method starts in step S100 with triggering for suspending by the control instance 30 with a prepare for suspending command. In step S102 it is checked if a hypervisor 20, 22 may be able to suspend a virtual machine 10, 14 at a requested point in time. If not, the control instance 30 cancels the operation in step S116. If the answer is yes, next in step S104 the control instance 30 is calling for suspending the virtual machines 10, 14. Then in step S106 the corresponding hypervisor 20, 22 starts suspending the virtual machines 10, 14. Next in step S108 the hypervisor 20, 22 is storing the states of the virtual machine 10, 14 and in step S110 the hypervisor is returning a clock state of the virtual machine 10, 14 to the control instance 30. Finally in step S112 the control instance 30 is storing the states and the clock state of the virtual machines 10, 14 in a database 42 managed by the control instance 30. In step S114 it is checked if there are more virtual machines 10, 14 to be suspended. If the answer is yes, the whole loop starts again with step S102, otherwise the process is finished.

Thus, due to a described method, for suspending multiple virtual machines 10, 14, each hypervisor 20, 22 is returning a clock state of the virtual machine 10, 14 requested for suspending to the control instance 30 and the control instance 30 storing the clock state of the virtual machine 10, 14.

Figure 2:
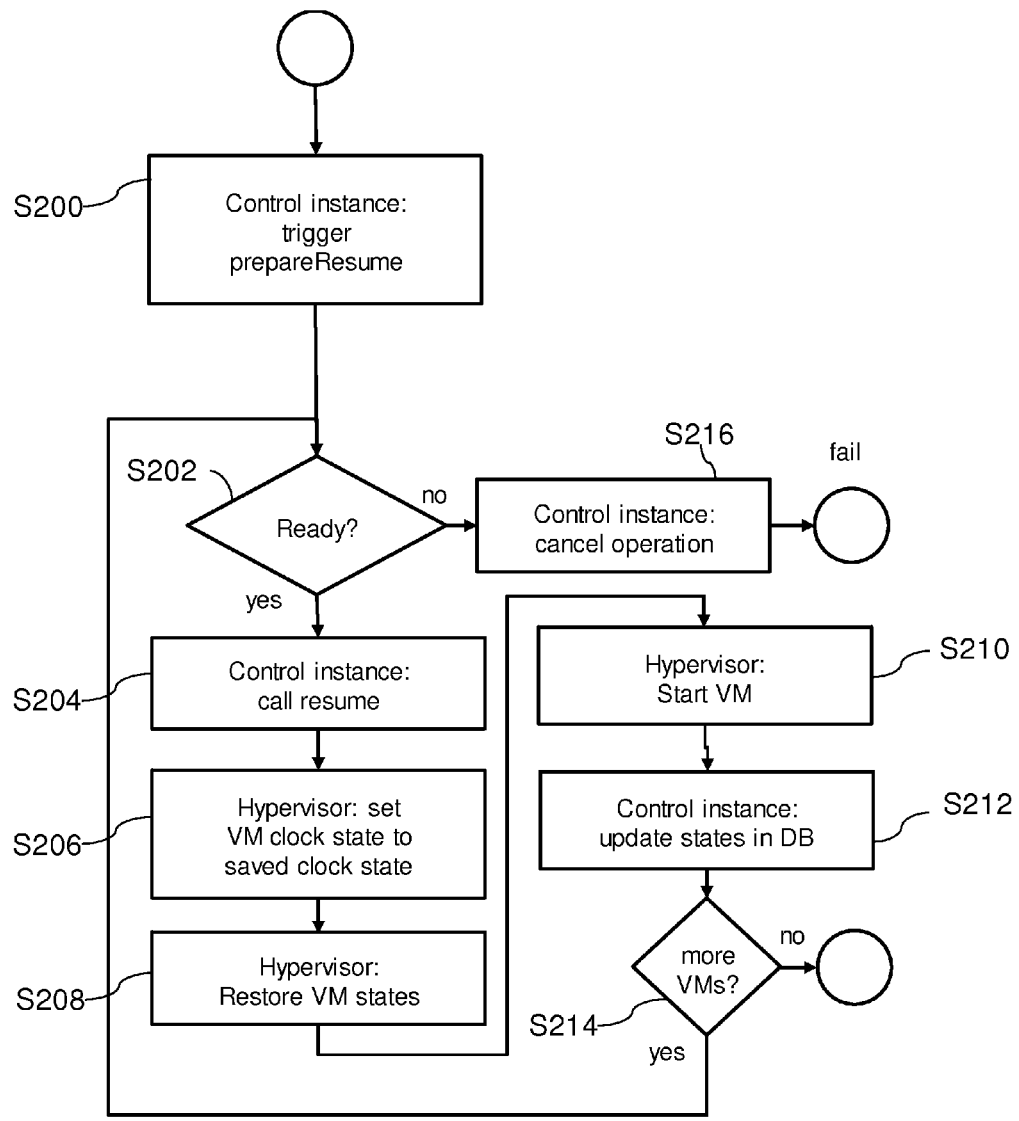
FIG. 2 depicts a flowchart for explanation of the method for suspending multiple virtual machines according to an embodiment, for the case of resuming virtual machines.

FIG. 2 is depicting a corresponding flowchart for explanation of the method for resuming multiple virtual machines 10, 14 according to an embodiment, for the case of resuming virtual machines 10, 14. Reference numerals used for explanation are referring to elements shown in FIGS. 3 and 4.

The method starts in step S200 with triggering for resuming by the control instance 30 with a prepare for resuming command. In step S202 it is checked if a hypervisor 20, 22 may be able to resume a virtual machine 10, 14 at a requested second point in time. If not, the control instance 30 cancels the operation in step S216. If the answer is yes, next in step S204 the control instance 30 calling for resuming the virtual machines 10, 14 and retrieving the clock states of the virtual machines 10, 14 and passed to the corresponding hypervisor 20, 22. Then in step S206 the hypervisor 20, 22 is setting the clock state of the virtual machine 10, 14 to the retrieved clock state, by updating the clock state of the virtual real time clocks 41, 44 which are then setting the corresponding system clocks 56, 58 of the virtual machines 10, 14. Next in step S208 the hypervisor 20, 22 starts restoring the states of the virtual machine 10, 14. Then in step S210 the hypervisor is starting the virtual machine 10, 14. Finally in step S212 the control instance 30 is updating the states of the virtual machines 10, 14 in the database 42. In step S214 it is checked if there are more virtual machines 10, 14 to be resumed. If the answer is yes, the whole loop starts again with step S202, otherwise the process is finished.

Thus, due to a disclosed method, for resuming multiple virtual machines 10, 14, the control instance 30 is retrieving a stored clock state of the virtual machine 10, 14 requested for resuming and returning the clock state to the corresponding hypervisor 20, 22. Then each hypervisor 20, 22 is setting a clock state of the virtual machine 10, 14 to the retrieved clock state.

Figure 3:
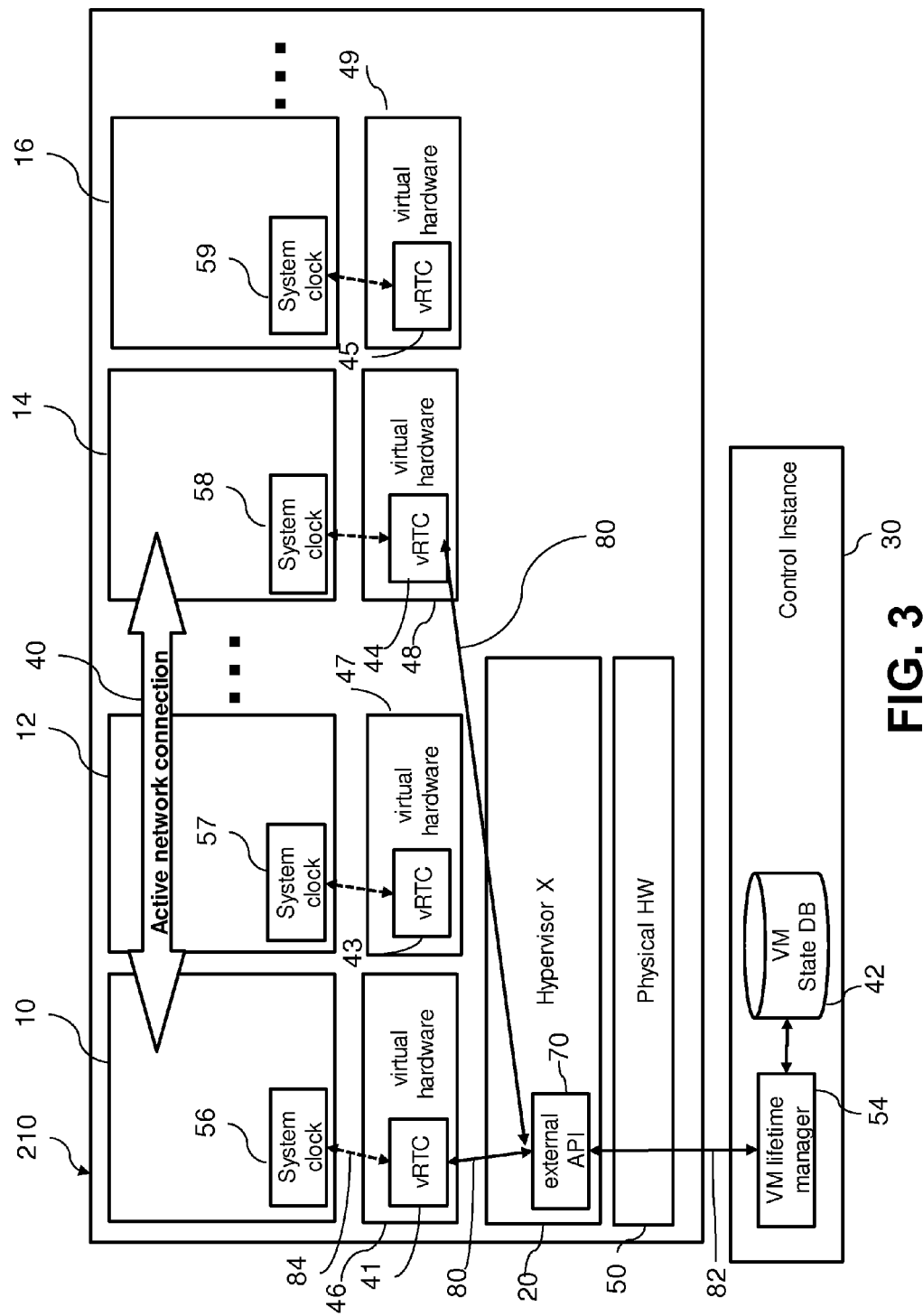
FIG. 3 depicts an example embodiment of a data processing system with at least one hypervisor executing the method for suspending multiple virtual machines according to an embodiment.

FIG. 3 shows an example embodiment of a data processing system 210 with at least one hypervisor 20 executing the method for suspending multiple virtual machines 10, 14 according to an embodiment. The data processing system 210 comprises a physical hardware 50. The data processing system 210 comprises a hypervisor 20 for control of virtual machines 10, 12, 14, 16 running on a corresponding virtual hardware 46, 47, 48, 49. The virtual hardware 46, 47, 48, 49 has a virtual real time clock 41, 43, 44, 45 implemented, which is the source for the system clock 56, 57, 58, 59 implemented inside the operating system running on the VMs 10, 12, 14, 16. The virtual machines 10, 12, 14, 16 are connected via a network connection 40. The data processing system 210 is controlled by a control instance 30, comprising at least a virtual machine lifetime manager 54 as a control instance manager and a database 42 storing states and clock states of the virtual machines 10, 12, 14, 16. The hypervisor 20 further comprises external APIs 70 for enabling the method for suspending the virtual machines 10, 14 by additional services. The VM lifetime manager 54 is communicating via the API 70 (signal flow 82) implemented in the hypervisor 20 to the virtual real time clocks 41, 43, 44, 45 (signal flow 80) of the virtual hardware 46, 48 and from there to the system clocks 56, 58 (signal flow 84) of the virtual machines 10, 14.

Figure 4:
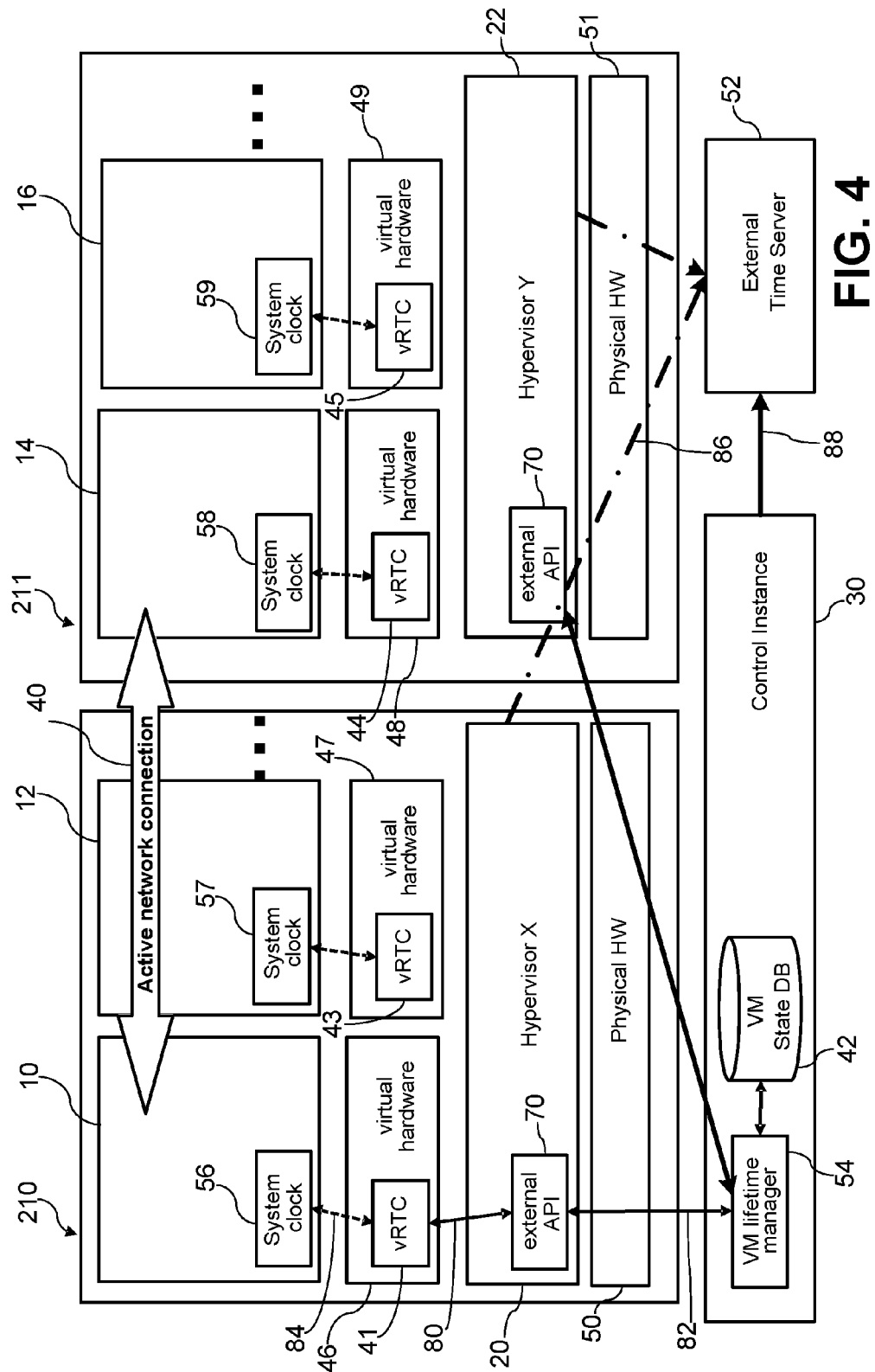
FIG. 4 depicts an example embodiment of two data processing systems with two hypervisors executing the method for suspending multiple virtual machines according to another embodiment.

FIG. 4 shows an example embodiment of two data processing systems 210, 211 with two hypervisors 20, 22, executing the method for suspending multiple virtual machines 10, 14 according to an embodiment. Each data processing system 210, 211 comprises a physical hardware 50, 51. Each data processing system 210, 211 comprises a hypervisor 20, 22 for control of virtual machines 10, 12, 14, 16 running on a corresponding virtual hardware 46, 47, 48, 49. The virtual hardware 46, 47, 48, 49 has a virtual real time clock 41, 43, 44, 45 implemented, which is the source for the system clock 56, 57, 58, 59 implemented inside the operating system running on the VMs 10, 12, 14, 16. The virtual machines 10, 12, 14, 16 are connected via a network connection 40. The data processing systems 210, 211 are controlled by a control instance 30, comprising at least a virtual machine lifetime manager 54 as a control instance manager and a database 42 storing states and clock states of the virtual machines 10, 12, 14, 16. The control instance 30 as well as the hypervisors 20, 22 are communicating to an external time server 52 (signal flow 88 and 86, respectively) to synchronize their internal timers, e.g. via NTP. The hypervisors 20, 22 further comprise external APIs 70 for enabling the method for suspending the virtual machines 10, 14 by additional services. The VM lifetime manager 54 is communicating via the APIs 70 (signal flow 82) implemented in the hypervisors 20, 22 to the virtual real time clocks 41, 43, 44, 45 (signal flow 80) of the virtual hardware 46, 48 and from there to the system clocks 56, 58 (signal flow 84) of the virtual machines 10, 14.

Figure 5:
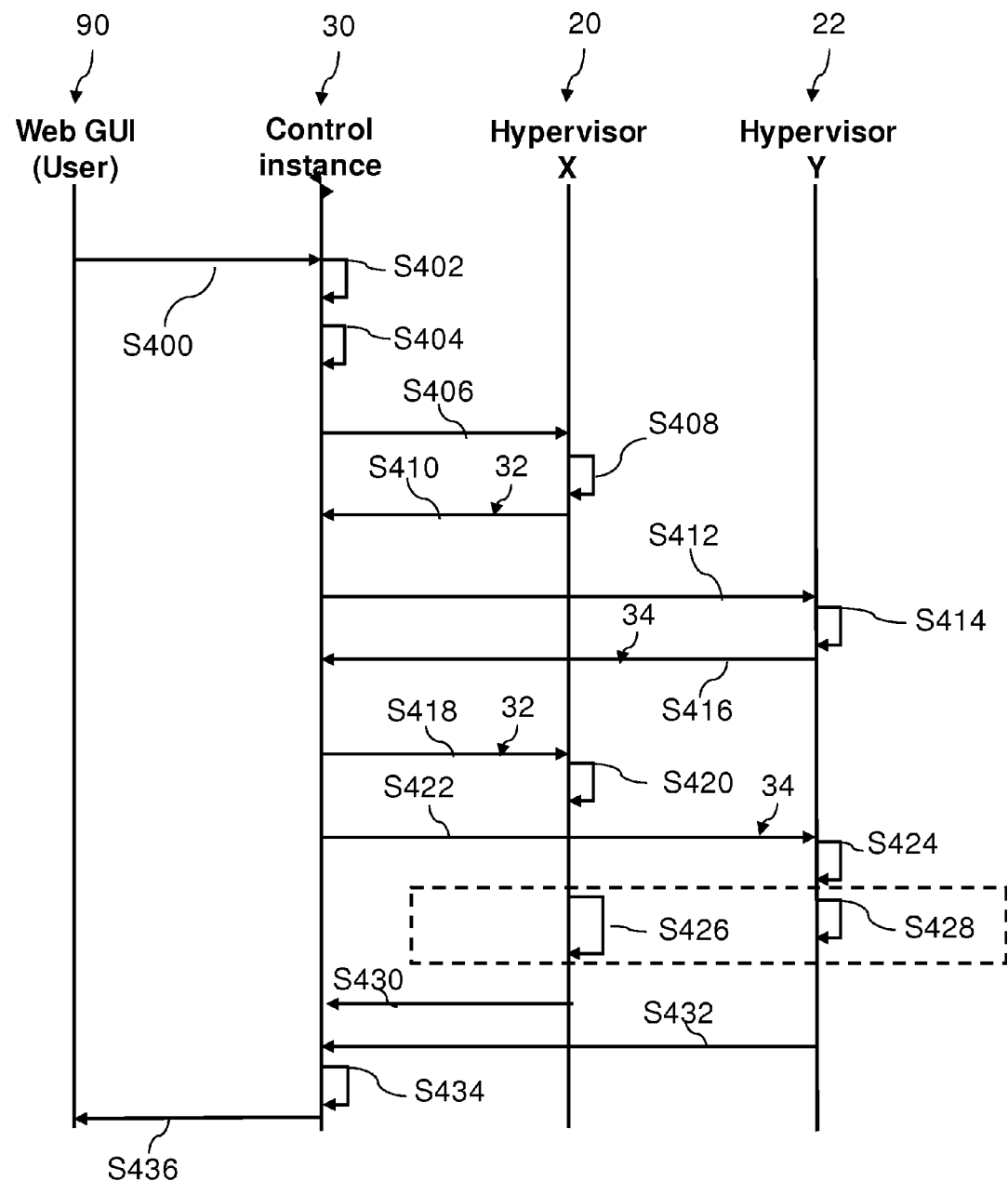
FIG. 5 depicts a signal flow of an implementation of the method for suspending multiple virtual machines according to an embodiment, for the case of suspending virtual machines.

In FIG. 5 a signal flow of an implementation of the method for suspending multiple virtual machines 10, 14 according to an embodiment is shown for the case of suspending virtual machines 10, 14. Reference numerals used for explanation and not depicted in the Figure are referring to elements shown in FIGS. 3 and 4.

The method for suspending multiple virtual machines 10, 14 which are executed simultaneously by two hypervisors 20, 22 in at least one data processing system 210, 211, starts in step S400 by triggering the suspending for a connected simulation environment by a user via a Web graphical user interface (GUI) 90 at the control instance 30. Then in steps S402 an ID of related virtual machines 10, 14 and in S404 a first point in time for suspending is determined by the control instance 30. Next, in steps S406 and S412, the control instance 30 is sending a request to each of the hypervisors 20, 22 to suspend the virtual machines 10, 14 at a given future first point in time. In steps S408 and S414, a handle 32, 34 for each of the virtual machines 10, 14 that are requested to be suspended is created and then, in response to receiving the request to suspend virtual machines 10, 14 from the control instance 30, each hypervisor 20, 22 is determining if its virtual machines 10, 14 can be suspended at the first point in time, and, if the suspending is possible, is returning in steps S410 and S416, respectively, a suspend handle 32, 34 to the control instance 30 and storing the suspend handle 32, 34, otherwise returning an invalid handle. When receiving a suspend handle 32, 34 from each of the hypervisors 20, 22 in return to the request to suspend virtual machines 10, 14, the control instance 30 is sending a suspend command in steps S418 and S422 to each of the hypervisors 20, 22, wherein the respective suspend handle 32, 34 is provided to the corresponding hypervisor 20, 22. In response to receiving a suspend command with a suspend handle 32, 34 from the control instance 30, each hypervisor 20, 22 is determining in steps S420 and S424, respectively, if the received suspend handle 32, 34 is equal to its stored handle and, if that is the case, is suspending in steps S426 and S428 its virtual machines 10, 11 at the first point in time. In steps S430 and S432 the hypervisors 20, 22 are returning the clock states of the virtual machines 10, 14 suspended to the control instance 30, which in step S434 stores states and clock states of the virtual machines 10, 14 suspended in the database 42. Finally in step S436 the status of the suspend operation is reported to the user.

According to a method, the first point in time to suspend the virtual machines 10, 14 and/or the second point in time to resume the virtual machines 10, 14 are synchronized by the control instance 30 for the two hypervisors 20, 22.

Figure 6:
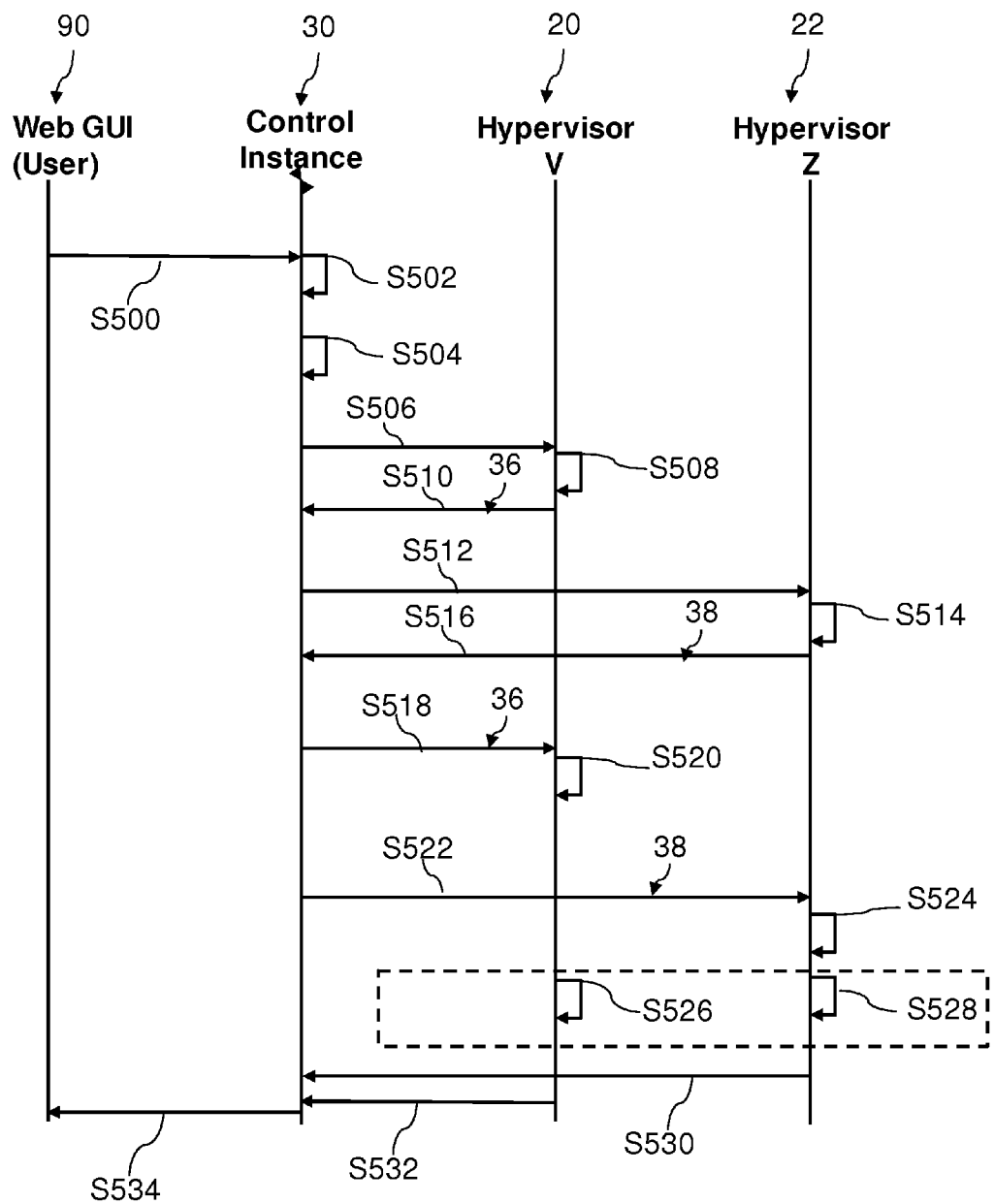
FIG. 6 depicts a signal flow of an implementation of the method for suspending multiple virtual machines according to an embodiment, for the case of resuming virtual machines.

In FIG. 6 a corresponding signal flow of an implementation of the method for suspending multiple virtual machines 10, 14 according to an embodiment is shown for the case of resuming virtual machines 10, 14. Reference numerals used for explanation and not depicted in the Figure are referring to elements shown in FIGS. 3 and 4.

The method starts in step S500 by triggering the resuming of virtual machines 10, 14 by a user via the Web GUI 90 at the control instance 30. In step S502 clock states of the suspended virtual machines 10, 14 are retrieved by the control instance 30 from the database 42 and in step S504 the involved hypervisors 20, 22 are determined. In steps S506 and S512, respectively, the control instance 30 is sending a request to each of the hypervisors 20, 22 to resume virtual machines 10, 14 at a given future second point in time. In response to receiving a request to resume virtual machines 10, 14 from the control instance 30, each hypervisor 20, 22 is determining in steps S508 and S514, after creating a handle 32, 34 for each of the virtual machines 10, 14 that are requested to be resumed and then, if its suspended virtual machines 10, 14 can be resumed at the second point in time, and, if the resuming is possible, is returning in steps S510 and S516 a resume handle 36, 38 to the control instance 30, otherwise returning an invalid handle. When receiving a resume handle 36, 38 from each of the hypervisors 20, 22 in return to the request to resume virtual machines 10, 14, the control instance 30 is sending in steps S518 and S522 a resume command to each of the hypervisors 20, 22, wherein the respective resume handle 36, 38 is provided to the corresponding hypervisor 20, 22. In response to receiving a resume command with a resume handle 36, 38 from the control instance 30, each hypervisor 20, 22 is determining in steps 520 and S524, if the received resume handle 36, 38 is equal to its stored handle and, if that is the case, is resuming in steps S526 and S528 its suspended virtual machines 10, 14 at the second point in time. In steps S530 and S532 the hypervisors 20, 22 are returning a status of the resumed virtual machines 10, 14 to the control instance 30 and in step S534 the status is reported to the user.

According to one embodiment, the multiple virtual machines 10, 14 are resumed at the clock state where the virtual machines 10, 14 were suspended. Alternatively upon resuming the multiple virtual machines 10, 14, an offset between system clocks 56, 58 of the multiple virtual machines (10, 14) may be determined. Then according to another embodiment the virtual machine 10, 14 may be resumed at a clock state updated with the offset between system clocks 56, 58 of the multiple virtual machines 10, 14 when being suspended.

Additionally it may be possible that the virtual real time clock 41, 44 is adapted to the retrieved clock state of the virtual machine 10, 14 resumed.

Figure 7:
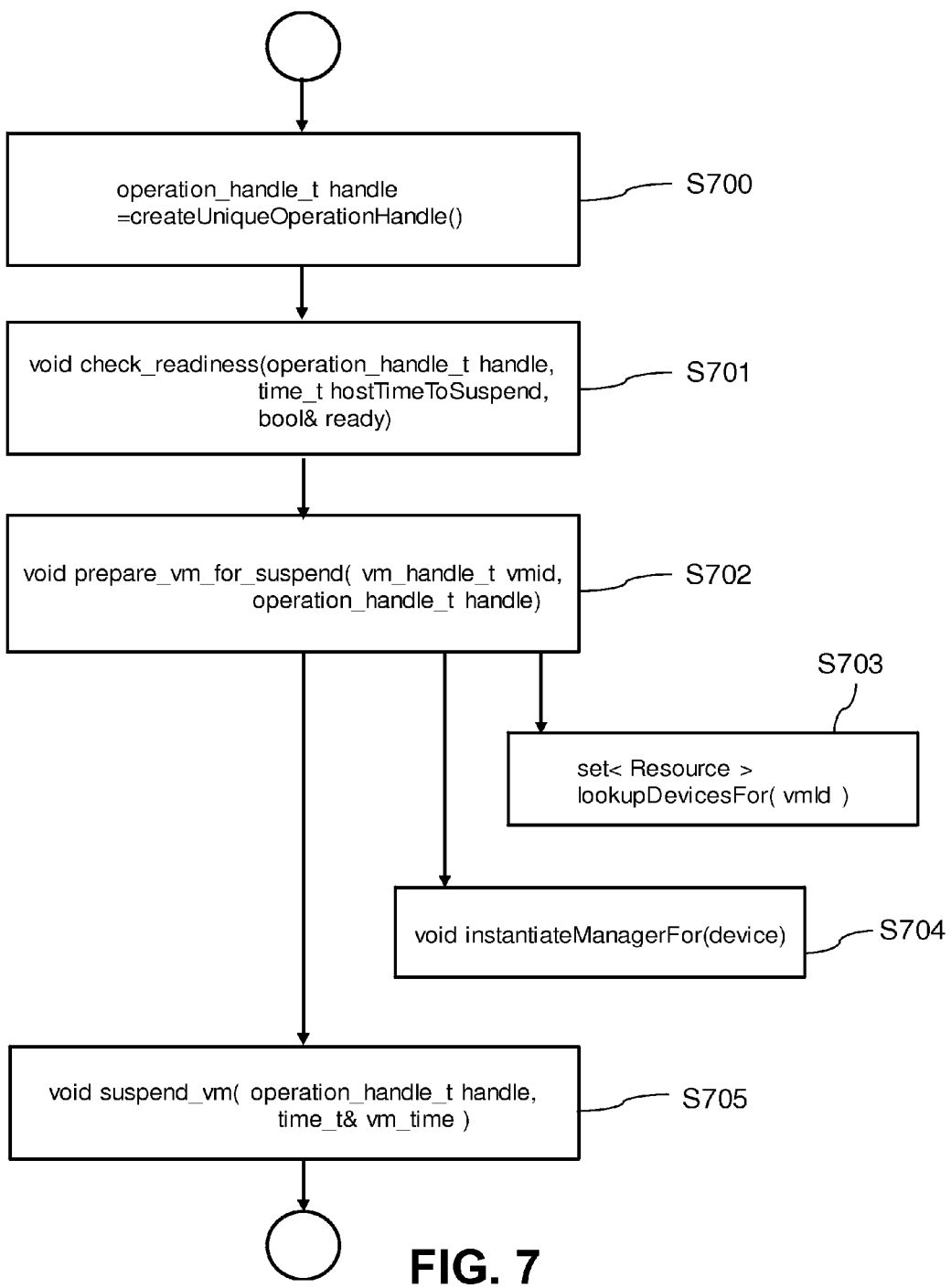
FIG. 7 depicts a hypervisor API for suspending virtual machines according to an embodiment.

FIG. 7 depicts a hypervisor API for suspending virtual machines 10, 14 according to an embodiment.

Initially, in step S700, a handle 32, 34 for each of the virtual machines 10, 14 that are requested to be suspended, is created.

In step S701 a function check_readiness checks if a virtual machine 10, 14 may be suspended at a given host time. The function uses as an input the handles 32, 34 for the actual suspend operation, and the expected time when the suspend operation is planned (hostTimeToSuspend). The function creates a readiness indication for this operation. Steps S700, S701 correspond to a first part of steps S408, S414 in the signal flow of FIG. 5. Step S701 may be implemented as:

```
void check_readiness( operation_handle_t handle,
                     time_t hostTimeToSuspend,
                     bool& ready )
{
    /* time a VM requires to suspend on hypervisor command */
    static const requiredTimeToSuspend = 5msec;
    /* overhead expected by network latency, host utilization etc. */
    static const expectedDelay = 20msec;
    time_t currentTime = getHostTime( );
    ready = currentTime + requiredTime + expectedDelay <
            hostTimeToSuspend;
    // determine time for operation to start
    hostTimeToSuspend[handle] = hostTimeToSuspend
        - requiredTime + expectedDelay;
}
```

The function check_readiness checks, if at a time hostTimeToSuspend, starting from the time currentTime, given a time requiredTimeToSuspend and an expected delay time expectedDelay a virtual machine 10, 14 with handles 32, 34 may be suspended. If the check is successful, a ready as an output is returned.

In step S702 then a function prepare_vm_for_suspend prepares a virtual machine 10, 14 to be suspended at a given host time. The function creates a readiness indication for this operation. The function also uses a handle 32, 34 for the actual suspend operation. Step S702 corresponds to a second part in steps S408 and S414 in the signal flow of FIG. 5 and may be implemented as:

```
void prepare_vm_for_suspend( vm_handle_t vmid,
                             operation_handle_t handle )
{
    resources = lookupDevicesFor( vmId ); //network + disk devices
    for( Resource device: resources){
        //instantiate management instances for later suspend &
        // release of devices like VPN connections or disks
        manager = instantiateManagerFor( device );
        resourceManagers[handle].addDeviceManager( manager );
    }
}
```

The function prepare_vm_for_suspend uses a unique operation handle 32, 34 and scans network and disk devices for use by the virtual machine 10, 14. For all resources found to be used by the virtual machine 10, 14 the function releases devices like VPN connections or disks. Then the function instantiates a VM lifetime manager 54. The function prepare_vm_for_suspend uses the functions lookupDevicesFor of step S703 as well as the function InstantiateManagerFor of step S704.

In step S703 a function lookupDevicesFor determines used devices for a specific virtual machine 10, 14. The function returns the devices found to be used by the virtual machine 10, 14. The function is used by the step S702 and may be implemented as:

```
set< Resource > lookupDevicesFor( vmId )
{
    set< Resource > deviceList;
    deviceList.addAll( hypervisor.listNetworkDevices(vmId) );
    deviceList.addAll( hypervisor.listVPNEndpoints(vmId) );
    deviceList.addAll( hypervisor.listDiskDevices(vmId) );
}
```

The function lookupDevicesFor looks for network devices, VPN connections, disk drives to be used by a specific virtual machine 10, 14 and instantiates specific device managers to reduce the time for the actual suspend operation. The function lookupDevicesFor returns the identification of resources found.

Next, in step S704 a function instantiateManagerFor instantiates specific device managers and associate devices. It reduces the time for the actual suspend operation. The function instantiateManagerFor may be implemented as:

```
void instantiateManagerFor( device )
{
        manager = managerFactory.getInstance(device);
        manager.registerOn(device);
}
```

Finally in step S705 a function suspend_vm executes the actual suspend operation. The function suspend_vm suspends a virtual machine 10, 14 and returns the clock state of the virtual machine. This function corresponds to steps S418, S422 in the signal flow of FIG. 5 and may be implemented as:

```
void suspend_vm( operation_handle_t handle,
                            time_t& vm_time )
{
    waitUntil( hostTimeToSuspend[handle] )
    vm_time = hypervisor.cmos_ioport_read( handle );
    hypervisor.suspend( handle );
    for( ResourceManager manager: resourceManagers[handle]){
            manager.freeResource( );
    }
}
```

The function suspend_vm uses, as an input, the operation handle 32, 34 as well as a reference to return as an output the clock state of the virtual machine 10, 14 at the point in time it is suspended. The function waits until the time to suspend is reached and then initiates the hypervisor 20, 22 to suspend the virtual machine 10, 14. The resources used by the virtual machine 10, 14 will then be freed.

Figure 8:
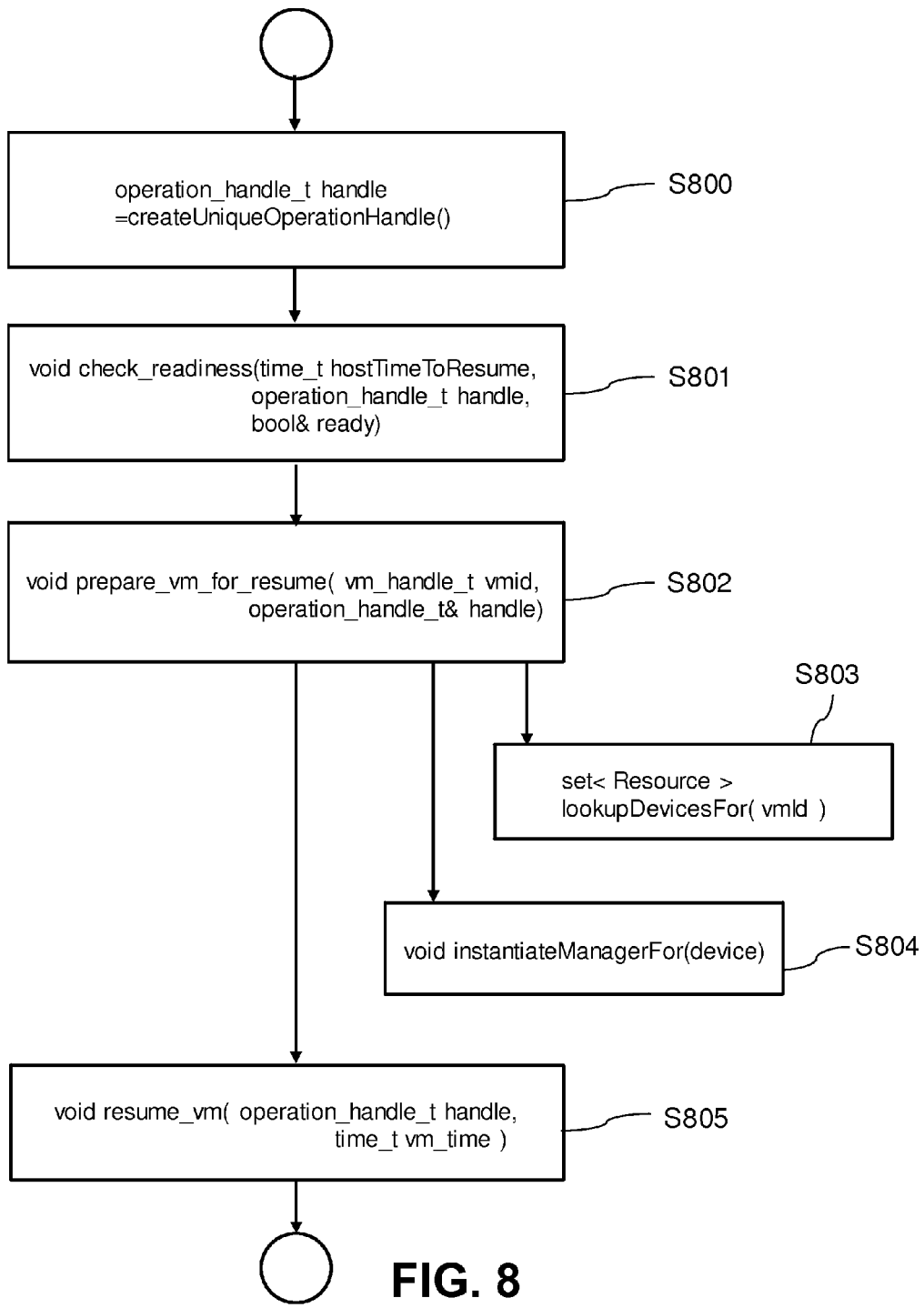
FIG. 8 depicts a hypervisor API for resuming virtual machines according to an embodiment.

FIG. 8 depicts a hypervisor API for resuming virtual machines 10, 14 according to an embodiment.

Initially, in step S800, a handle 32, 34 for each of the virtual machines 10, 14 that are requested to be resumed, is created.

In step S801 a function check_readiness checks if a virtual machine 10, 14 may be resumed at a given host time. The function uses as an input the handles 32, 34 for the actual resume operation, and the expected time when the resume operation is planned (hostTimeToResume). The function creates a readiness indication for this operation. Steps S800, S801 correspond to a first part of steps S508, S514 in the signal flow of FIG. 6. Step S801 may be implemented as:

```
void check_readiness( time_t hostTimeToResume,
                            operation_handle_t handle,
                            bool& ready )
{
    /* time a VM requires to resume on hypervisor command */
    static const requiredTimeToResume = 42msec;
    /* overhead expected by network latency, host utilization etc. */
    static const expectedDelay = 20msec;
    time_t currentTime = getHostTime( );
    ready = currentTime+requiredTimeToResume+expectedDelay <
                    hostTimeToResume;
    // determine time for operation to start
    hostTimeToResume[handle] = hostTimeToResume
            - requiredTimeToResume + expectedDelay;
}
```

The function check_readiness checks, if at a time hostTimeToResume, starting from the time currentTime, given a time requiredTimeToResume and an expected delay time expectedDelay a virtual machine 10, 14 with handles 32, 34 may be resumed. If the check is successful, a ready as an output is returned.

In step S802 then a function prepare_vm_for_resume prepares a virtual machine 10, 14 to be resumed at a given host time. The function creates a readiness indication for this operation. The function also uses a handle 32, 34 for the actual resume operation. Step S802 corresponds to a second part in steps S508 and S514 in the signal flow of FIG. 6 and may be implemented as:

```
void prepare_vm_for_resume( vm_handle_t vmid,
                            operation_handle_t handle )
{
    resources = lookupDevicesFor( vmId ); //network + disk devices
    for( Resource device: resources){
            //instantiate management instances for later resume &
            // creation of devices like VPN connections or disks
            manager = instantiateManagerFor( device );
            resourceManagers[handle].addDeviceManager( manager );
    }
}
```

The function prepare_vm_for_resume uses unique operation handles 32, 34 and scans network and disk devices required for resuming the virtual machines 10, 14. For all resources found to be required for resuming the virtual machines 10, 14 the function creates devices like VPN connections or disks. Then the function instantiates a VM lifetime manager 54. The function prepare_vm_for_resume uses the functions lookupDevicesFor of step S803 as well as the function InstantiateManagerFor of step S804.

In step S803 a function lookupDevicesFor determines devices required for resuming an inactive virtual machine 10, 14. The function returns the devices found to be required for resuming the virtual machines 10, 14. The function is used by the step S802 and may be implemented as:

```
set< Resource > lookupDevicesFor( vmId )
{
        set< Resource > deviceList;
        deviceList.addAll( hypervisor.listNetworkDevices(vmId) );
        deviceList.addAll( hypervisor.listVPNEndpoints(vmId) );
        deviceList.addAll( hypervisor.listDiskDevices(vmId) );
}
```

The function lookupDevicesFor looks for network devices, VPN connections, disk drives to be required for resuming a specific virtual machine 10, 14 and instantiates specific device managers to reduce the time for the actual resume operation. The function lookupDevicesFor returns the identification of resources found to be required.

Next, in step S804 a function instantiateManagerFor instantiates specific device managers and associate devices. It reduces the time for the actual resume operation. The function instantiateManagerFor may be implemented as:

```
void instantiateManagerFor( device )
{
        manager = managerFactory.getInstance(device);
        manager.registerOn(device);
}
```

Finally in step S805 a function resume_vm executes the actual resume operation. The function resume_vm resumes a virtual machine 10, 14 and stores the time. This function corresponds to steps S518, S522 in the signal flow of FIG. 6 and may be implemented as:

```
void resume_vm( operation_handle_t handle,
                        time_t vm_time )
{
    waitUntil( hostTimeToResume[handle] )
    for( ResourceManager manager: resourceManagers[handle]){
        manager.setupResource( );
    }/
    / set up the vRTC emulation
    hypervisor.cmos_ioport_write( handle, vm_time );
    // ...and resume the VM
    hypervisor.resume( handle );
}
```

The function resume_vm uses, as an input, the operation handle 32, 34 as well as the time of the virtual clock of the VM to be started. The function waits until the time to resume is reached and then initiates the hypervisor 20, 22 to resume the virtual machines 10, 14. The virtual real time clocks 41, 44 used by the virtual hardware 46, 48 are set up in order the virtual machines 10, 14 to be resumed.

Figure 9:
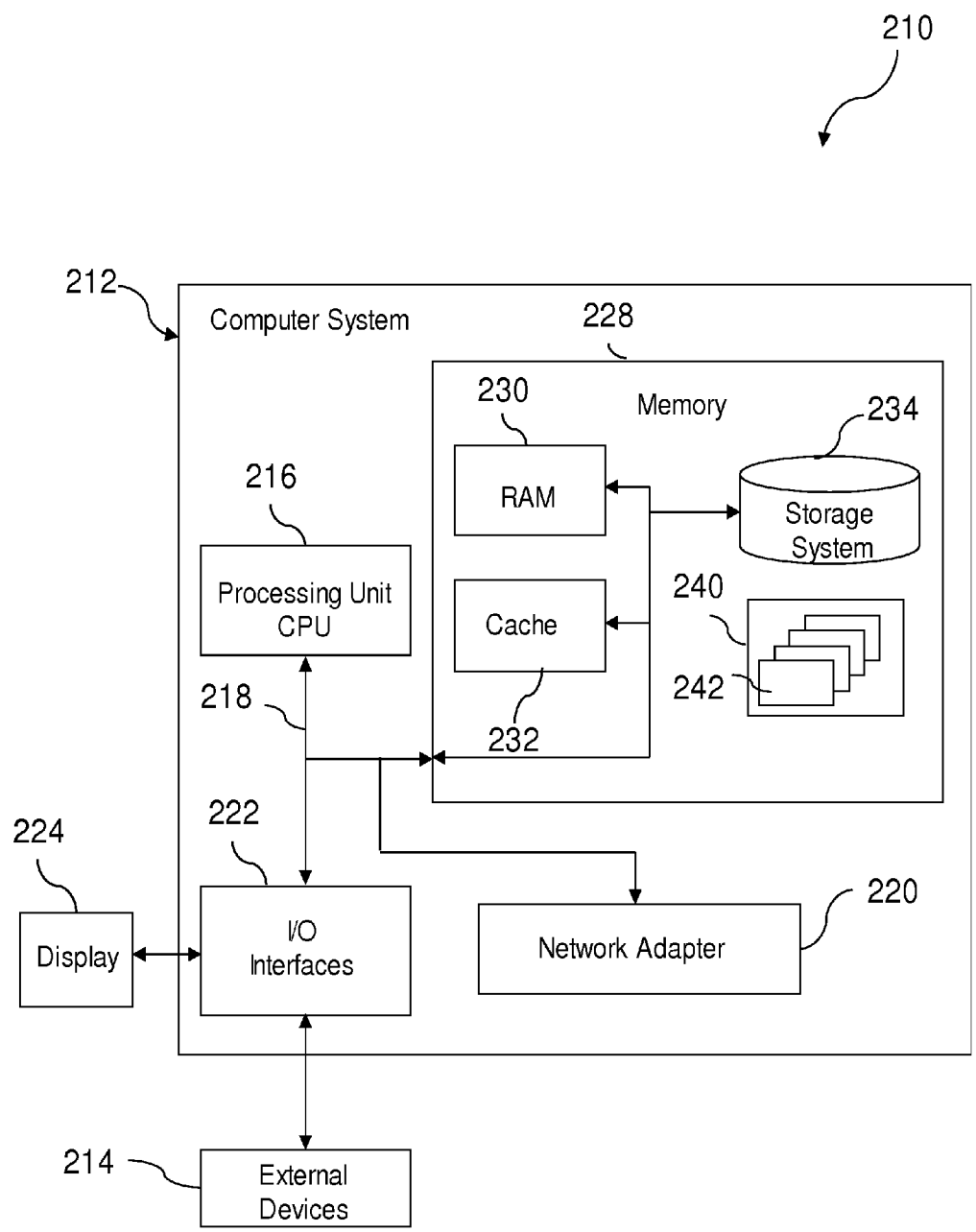
FIG. 9 depicts an example embodiment of a data processing system for executing a method according to an embodiment.

Referring now to FIG. 9, a schematic of an example of a data processing system 210 is shown. Reference numerals used for explanation and not depicted in the Figure are referring to elements shown in FIG. 3.

Data processing system 210 is only one example of a suitable data processing system and is not intended to suggest any limitation as to the scope of use or functionality of embodiments, as described herein. Regardless, data processing system 210 is capable of being implemented and/or performing any of the functionality set forth herein above.

The data processing system 210 is capable of running a computer program product comprising a computer usable medium including a computer readable program, wherein the computer readable program when executed on a computer system 212 causes the computer system 212 to perform a method for suspending multiple virtual machines 10, 14 executed simultaneously by at least one hypervisors 20, 22 in at least one data processing system 210, 211, comprising, (i) sending, by a control instance 30, a request to the at least one hypervisor 20, 22 to suspend virtual machines 10, 14 at a given future first point in time; (ii) in response to receiving a request to suspend virtual machines 10, 14 from the control instance 30, the hypervisor 20, 22 determining if its virtual machines 10, 14 can be suspended at the first point in time, and, if the suspending is possible, returning a suspend handle 32, 34 to the control instance 30 and storing the suspend handle 32, 34, otherwise returning an invalid handle; (iii) when receiving a suspend handle 32, 34 from the hypervisor 20, 22 in return to the request to suspend virtual machines 10, 14, the control instance 30 sending a suspend command to the hypervisor 20, 22, wherein the respective suspend handle 32, 34 is provided to the corresponding hypervisor 20, 22; (iv) in response to receiving a suspend command with a suspend handle 32, 34 from the control instance 30, the hypervisor 20, 22 determining if the received suspend handle 32, 34 is equal to its stored handle and, if that is the case, suspending its virtual machines 10, 11 at the first point in time.

In data processing system 210 there is a computer system/server 212, which is operational with numerous other general purpose or special purpose computing system environments or configurations. Examples of well-known computing systems, environments, and/or configurations that may be suitable for use with computer system/server 212 include, but are not limited to, micro-controllers, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216. Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments.

Program/utility 240, having a set (at least one) of program modules 242, may be stored in memory 228 by way of example, and not limitation, as well as an operating system, one or more application programs, other program modules, and program data.

Each of the operating system, one or more application programs, other program modules, and program data or some combination thereof, may include an implementation of a networking environment. Program modules 242 generally carry out the functions and/or methodologies of embodiments as described herein.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

The block diagrams in the figures illustrate the architecture, functionality, and operation of possible implementations of systems, methods and computer program products according to various embodiments of the present disclosure. In this regard, each block in the block diagrams may represent a module, segment, or portion of code, which comprises one or more executable instructions for implementing the specified logical functions. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

What is claimed is:

1. A method for simultaneously suspending multiple virtual machines, executed by at least one hypervisor, in at least one data processing system, comprising:
   sending, by a control instance, a request to the at least one hypervisor to suspend a set of two or more virtual machines, the request including a future first point in time to suspend the execution of each virtual machine in the set of two or more virtual machines;
   determining, by the at least one hypervisor and in response to receiving the request, whether each virtual machine in the set of two or more virtual machines can be suspended at the future first point in time and storing a suspend handle corresponding to each virtual machine in the set of two or more virtual machines that can be suspended;
   returning to the control instance, by the at least one hypervisor and in response to the determining, a suspend handle corresponding to each virtual machine in the set of two or more virtual machines that can be suspended and an invalid handle corresponding to each virtual machine in the set of two or more virtual machines that cannot be suspended;
   sending, by the control instance and in response to subsequently receiving suspend handles corresponding to each of the set of two or more virtual machines from the at least one hypervisor, a suspend command with the received suspend handles to the at least one hypervisor; and
   simultaneously suspending, by the at least one hypervisor in response to receiving a suspend command with suspend handles from the control instance, each virtual machine corresponding to a suspend handle in the suspend command at the future first point in time.

2. The method of claim 1, further comprising:
   sending, by the control instance, a resume request to the at least one hypervisor to resume a set of two or more suspended virtual machines, the resume request including a future second point in time to resume the execution of each virtual machine in the set of two or more suspended virtual machines;
   determining, by the at least one hypervisor and in response to receiving the resume request, whether each suspended virtual machine in the set of two or more suspended virtual machines can be resumed at the second point in time;
   returning to the control instance, by the at least one hypervisor and in response to the determining, a resume handle corresponding to each suspended virtual machine in the set of two or more suspended virtual machines that can be resumed and an invalid handle corresponding to each virtual machine in the set of two or more suspended virtual machines that cannot be resumed;
   sending, by the control instance and in response to subsequently receiving resume handles corresponding to each of the set of two or more suspended virtual machines from the at least one hypervisor, a resume command with the received resume handles to the at least one hypervisor; and
   simultaneously resuming, by the at least one hypervisor in response to receiving a resume command with resume handles from the control instance, each suspended virtual machine corresponding to a resume handle in the resume command at the future second point in time.

3. The method of claim 2, further comprising:
   the control instance retrieving a stored clock state of the virtual machines in the set of two or more suspended virtual machines requested for resuming and returning the clock states to the corresponding hypervisor; and
   the corresponding hypervisor setting a clock state of the virtual machines in the set of two or more suspended virtual machines to the retrieved clock state.

4. The method of claim 2, wherein the first point in time to suspend the virtual machines in the set of two or more virtual machines and the second point in time to resume the virtual machines in the set of two or more suspended virtual machines are synchronized by the control instance for the at least one hypervisor.

5. The method of claim 2, wherein the method, in response to resuming by the control instance, further comprises:
   the control instance calling for resuming the virtual machines in the set of two or more suspended virtual machines and retrieving the clock states of the virtual machines;

the corresponding hypervisor setting the clock state of the virtual machines in the set of two or more suspended virtual machines to the retrieved clock states;

the corresponding hypervisor restoring the states of the virtual machine in the set of two or more suspended virtual machines;

the corresponding hypervisor starting the virtual machine in the set of two or more suspended virtual machines; and the control instance updating the states of the virtual machines in the set of two or more suspended virtual machines in a database.

6. The method of claim 5, wherein the virtual machines in the set of two or more suspended virtual machines are resumed at clock states that are updated with an offset between system clocks of the multiple virtual machines in the set of two or more virtual machines when being suspended.

7. The method of claim 6, wherein the clock states of the virtual machines in the set of two or more suspended virtual machines are the retrieved clock states of the resumed virtual machines.

8. The method of claim 1, further comprising:

the at least one hypervisor returning clock states of the virtual machines in the set of two or more virtual machines requested for suspending to the control instance; and the control instance storing the clock states of the virtual machines in the set of two or more virtual machines.

9. The method of claim 1, wherein the virtual machines in the set of two or more virtual machines are connected via a network.

10. The method of claim 1, wherein at least two hypervisors are being implemented on different data processing systems.

11. The method of claim 1, further comprising:

copying the suspended virtual machines in the set of two or more virtual machines;

retrieving the clock states of the suspended virtual machines in the set of two or more virtual machines; and resuming the copied virtual machines with the retrieved clock states.

12. The method of claim 1, wherein the method, subsequent to the suspending, further comprises:

the corresponding hypervisor storing the states of the virtual machine in the set of two or more virtual machines;

the hypervisor returning a clock state of the virtual machine in the set of two or more virtual machines to the control instance; and the control instance storing the states and the clock state of the virtual machines in the set of two or more virtual machines.

13. The method of claim 1, wherein the multiple virtual machines in the set of two or more virtual machines are resumed at the clock states where the virtual machines were suspended.

14. The method of claim 1, further comprising:

determining, in response to suspending the multiple virtual machines in the set of two or more virtual machines, an offset between system clocks of the multiple virtual machines.

* * * * *